(12) United States Patent
Pugliese

(10) Patent No.: US 7,278,099 B2
(45) Date of Patent: Oct. 2, 2007

(54) VISUAL GRAPHICAL INDICATION OF THE NUMBER OF REMAINING CHARACTERS IN AN EDIT FIELD OF AN ELECTRONIC DEVICE

(75) Inventor: Pierluigi Pugliese, Vaterstetten (DE)

(73) Assignee: Agere Systems Inc., Allentown, PA (US)

( * ) Notice: Subject to any disclaimer, the term of this patent is extended or adjusted under 35 U.S.C. 154(b) by 387 days.

(21) Appl. No.: 10/617,504

(22) Filed: Jul. 11, 2003

(65) Prior Publication Data

US 2004/0015786 A1  Jan. 22, 2004

(30) Foreign Application Priority Data

Jul. 19, 2002  (DE) ................ 102 32 907

(51) Int. Cl.
*G06F 17/00* (2006.01)
(52) U.S. Cl. .............. 715/530; 715/531; 715/772; 715/861; 715/833; 455/466; 455/566
(58) Field of Classification Search .......... 715/530, 715/531, 772, 861, 833; 455/405, 412.1, 455/412.2, 422.1, 466, 566
See application file for complete search history.

(56) References Cited

U.S. PATENT DOCUMENTS

| | | | | |
|---|---|---|---|---|
| 4,212,077 A | * | 7/1980 | Vittorelli ................ 715/530 |
| 4,323,315 A | * | 4/1982 | Demonte et al. .......... 400/63 |
| 4,360,806 A | * | 11/1982 | von Knorre et al. ........ 715/861 |
| 4,408,302 A | * | 10/1983 | Fessel et al. ................ 715/531 |
| 4,439,838 A | * | 3/1984 | Klingenberg ................ 715/531 |
| 4,922,448 A | * | 5/1990 | Kunieda et al. ............ 713/320 |
| 4,974,173 A | * | 11/1990 | Stefik et al. ................ 715/751 |
| 5,230,062 A | * | 7/1993 | Inaki et al. ................ 715/508 |
| 5,287,538 A | * | 2/1994 | Kawakami et al. ......... 715/523 |
| 5,301,348 A | * | 4/1994 | Jaaskelainen ................ 714/46 |
| 5,396,589 A | * | 3/1995 | Ohnishi ....................... 715/531 |
| 5,805,166 A | * | 9/1998 | Hall, Jr. et al. ............. 715/839 |
| 5,890,164 A | * | 3/1999 | Nielsen ....................... 707/201 |

(Continued)

OTHER PUBLICATIONS

Mackey,"CF_LimitedTextControl—Graphical limited text control for TextAreas and Text inputs", Digital Crew, Ltd., downloaded from http://www.cftagstore.com/tags/climitedtextcontrol.cfm, Jun. 17, 2004.*

(Continued)

*Primary Examiner*—Doug Hutton
*Assistant Examiner*—J H Blackwell

(57) ABSTRACT

The invention relates to the indication of the amount of characters, which can be still entered into an edit field of an electronic device. A main object of the invention is to provide a new and improved indication of the amount of remaining capacity for entering data in an edit field of an electronic device. The invention proposes to indicate the amount of data, in particular of characters, which can be entered in an edit field of an electronic device, by graphically visualizing the available capacity for entering data in the edit field. In one example, the graphic element is a cursor that changes, in terms of size, shape, color, etc., based on the amount of available capacity.

20 Claims, 2 Drawing Sheets

U.S. PATENT DOCUMENTS

| | | | | |
|---|---|---|---|---|
| 6,097,390 | A * | 8/2000 | Marks | 715/772 |
| 6,100,887 | A * | 8/2000 | Bormann et al. | 715/764 |
| 6,104,397 | A * | 8/2000 | Ryan et al. | 715/846 |
| 6,204,848 | B1 * | 3/2001 | Nowlan et al. | 715/810 |
| 6,275,987 | B1 * | 8/2001 | Fraley et al. | 717/127 |
| 6,411,315 | B1 * | 6/2002 | Young | 715/788 |
| 6,414,697 | B1 * | 7/2002 | Amro et al. | 715/772 |
| 6,473,104 | B1 * | 10/2002 | Harris | 715/833 |
| 6,496,870 | B1 * | 12/2002 | Faustini | 719/316 |
| 6,825,861 | B2 * | 11/2004 | Wasko et al. | 715/861 |
| 6,865,717 | B2 * | 3/2005 | Wright | 715/772 |
| 6,941,522 | B2 * | 9/2005 | Brown | 715/772 |
| 6,948,130 | B2 * | 9/2005 | Long et al. | 715/752 |
| 2003/0046401 | A1 * | 3/2003 | Abbott et al. | 709/228 |
| 2004/0088715 | A1 * | 5/2004 | Korall et al. | 719/318 |
| 2004/0207662 | A1 * | 10/2004 | Anderson et al. | 345/772 |
| 2005/0071753 | A1 * | 3/2005 | Klein et al. | 715/508 |

OTHER PUBLICATIONS

Jonk, "Form Field Progress bar", Oct. 13, 2004, DynamicDrive, downloaded from http://www.dynamicdrive.com/dynamicindex16/limitinput2.htm.*

Thacker,"Javascript Dynamic Text Area Counter", May 19, 2000, downloaded from http://www.shingingstar.net/articles/javascript/dynamictextareacounter.asp?ID=AW, pp. 5, 1A, 2, 3.*

Unknown,"Limit Textarea", Apr. 22, 2000,downloaded from http://javascript.internet.com/forms/limit-textarea.html.*

Author unknown,"JavaScript/ Limited Textarea Field, examples 1 & 2", BlueShoes PHP Framework & CMS, 2004?, downloaded from <http://www.blueshoes.org/en/javascript/limitedtextarea/> Mar. 1, 2007, 4 pages.*

Jonk, R., "Form Field Progress Bar", Dynamic Drive web site, Oct. 13, 2004, downloaded from <http://www.dynamicdrive.com/dynamicindex16/limitinput2.htm> ,2 pages.*

* cited by examiner a)

1a

2a

3a

4a b)

1b    2b    3b    4b

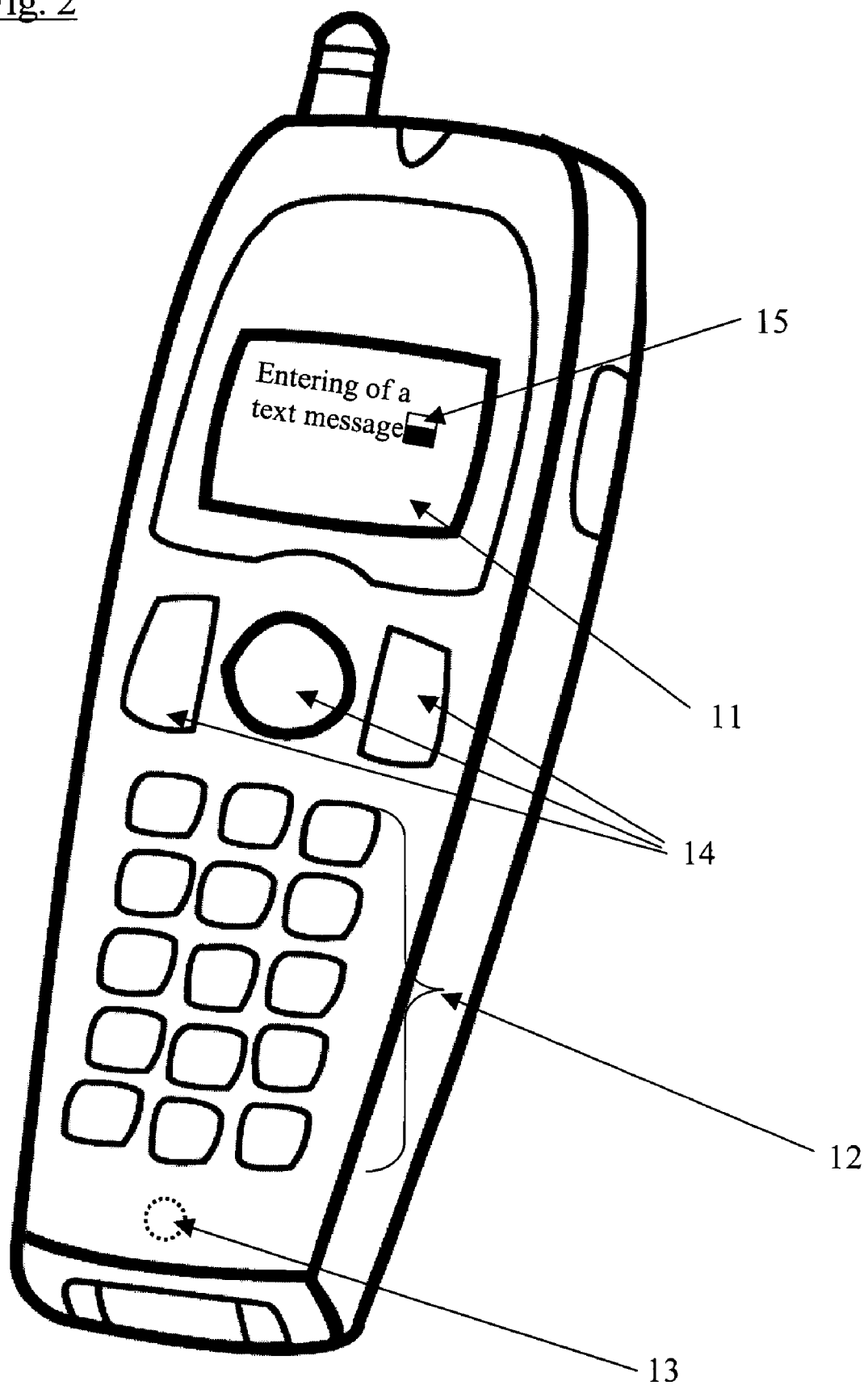

VISUAL GRAPHICAL INDICATION OF THE NUMBER OF REMAINING CHARACTERS IN AN EDIT FIELD OF AN ELECTRONIC DEVICE

CROSS-REFERENCE TO RELATED APPLICATION

This application claims priority of German Patent Application No. 102 32 907.9, which was filed on Jul. 19, 2002.

BACKGROUND OF THE INVENTION

The invention relates to a method and to an implementation software product for visually indicating the amount of characters, which can be still entered into an edit field of an electronic device, and to an electronic device having such functionality.

Usually, when entering data in an edit field of an electronic device, such as in an alphanumeric field of a mobile phone for example, there is often no indication for the user how many characters are still remaining for entering before the edit field is filled up and/or the amount entered characters that can be processed all at once in a subsequent common processing step is reached.

The only known solutions are based on a numerical indication, such as displaying the number of already typed characters or the number of remaining characters. However, one of the main problems with regard to such numerical indications is, that a user of the electronic device usually has difficulties in using these indications, since users normally do not think in terms of "characters" when they are writing a text, especially when writing a longer text.

Accordingly, a main object of the invention is, to provide a new and improved indication of the amount of remaining capacity for entering data in an edit field of an electronic device.

Accordingly the invention proposes a method for indicating the amount of data, in particular of characters, which can be entered in an edit field of an electronic device merely allowing a predefined amount of entered data for a common subsequent processing, by graphically visualizing the available capacity of the edit field.

Thus, in particular by using an electronic device having an edit field, means for entering data, preferably characters, into the edit field and means for processing a predefined maximal number of entered data all at once, wherein the device comprises a graphical element associated to the edit field for graphically visualizing the capacity available for entering data in the edit field and/or by using an implementation software product adapted to perform the inventive method, especially implemented within the afore stated device, a user is much more supported when writing a text, since he can evaluate from such kind of indication information how much empty space he has still available to express what he wants.

Preferably, the graphical indication is achieved by a graphical element associated to the edit field with its look changeable in functional dependency to the available space or capacity.

For the practice it is particularly proposed to divide the graphical element into two areas wherein the percentage each of the two areas is changed in functional dependency to the used capacity or to the still remaining capacity.

Additionally or as an alternative, the graphical element may be divided in several sub-portions, each of which is representing a predefined amount of capacity, so that for every amount of capacity already used one of these sub-portions is visually displayed, filled up or deleted.

According to a very preferred embodiment it is further proposed to change the look of a text cursor proportional to the number of remaining characters which can be still entered, since the attention of the user normally is focused already on the text cursor while he is writing the text.

Even the invention is preferably conceived for mobile phones, the invention can be similarly used in any electronic device where the user is prompt to enter a text, especially long texts, to paint pictures and/or to enter other data.

The invention is further proposing an implementation software product designed to perform or at least to support the inventive approach.

BRIEF DESCRIPTION OF THE DRAWINGS

Subsequently the invention is exemplary described with regard to preferred embodiments and with regard to the attached drawings, in which:

FIG. 2 is schematically showing a mobile phone as a preferred embodiment of an electronic device incorporating the inventive graphical element according to FIG. 1a as a text cursor.

DETAILED DESCRIPTION

Figure 1:
FIG. 1a is schematically showing a first inventive example of the change of a graphical element look for proportionally indicating the amount of remaining characters.
FIG. 1b is schematically showing a second inventive example of the change of a graphical element look for proportionally indicating the amount of remaining characters.
Figure 1:
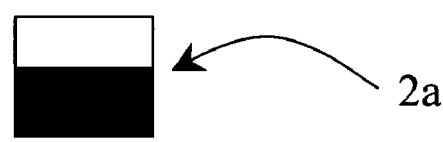
Figure 1:
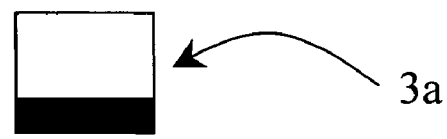
Figure 1:
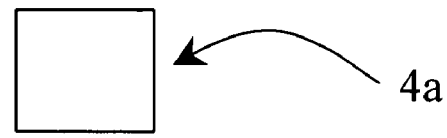
Figure 1:
Figure 1:
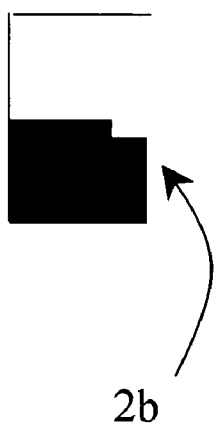
Figure 1:
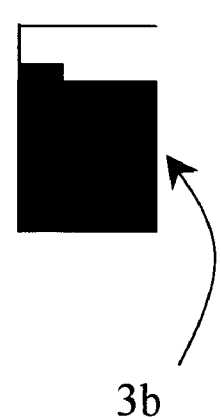
Figure 1:
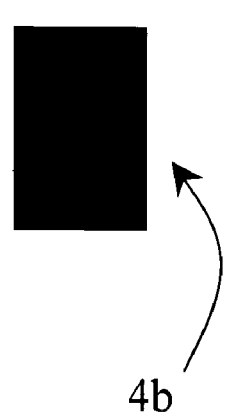

Regarding first FIG. 2, a mobile phone as a preferred embodiment for the inventive electronic device is schematically depicted. However, it is mentioned that the electronic device can be, in substantial, any electronic device having an edit field for visually entering data, such as characters for writing a text message. Accordingly, further preferred applications for the invention are electronic devices like a personal computer or a note book or a PDA (Personal Digital Assistant).

In practice, the mobile phone according to FIG. 2 is proposed to be adapted to operate on a GSM-standard (Global System for Mobile Communication) or UMTS-standard (Universal Mobile Telecommunication System) and is preferably adapted to support GPRS (General Packet Radio Services).

Regarding the inputting of characters with regard to the mobile phone as depicted in FIG. 2 in more detail, the mobile phone has an edit field 11, for entering, editing and visualizing entered characters. The characters are entered by pressing respective keys of a keyboard 12. However, even the entering of characters by using a microphone 13 connected with a speech control implemented within the electronic device or by using a touch screen monitor for entering the characters into the edit field is comprised by the invention.

The entered characters may be part of a text message to provide a so-called SMS (Short Message Service), since the exchange of text messages between different mobile phones has become very popular. In particular young people use the GSM-based SMS service very frequently to communicate with their peer group.

For sending the SMS-message, first a respective menu item implemented within the mobile phone is selected by correspondingly manually pressing at least one of the selection keys 14 for subsequently entering the text message by pressing the respective keys of the keypad 12. When the SMS-message is completed, a telephone number of the intended recipient is entered by selecting the corresponding telephone number by use of the menu selection keys 14 or in turn, by entering the telephone number by pressing the respective keys of the keypad 12. Finally, the text message is sent using the short message service based on the corresponding selection by means of the keys 14.

However, in particular with regard to such a SMS-message, the number of characters which can be sent all at once is restricted, such as to 160 characters for example based on GSM.

Thus, in particular when the user wants to write long messages, with the invention of graphically indicating the remaining amount of characters which can be entered for a common subsequent processing, the user is supported in optimally using the capacity for entering characters within the edit field 11.

Moreover, the edit field 11 is comprising a text cursor 15, which usually is represented as an all-black box. Since the attention of the user however, is focused time and again on the text cursor 15 while he is writing the text, the visual indication of the still available space in the edit field is preferably embedded in the cursor 15.

Therefore, within the preferred embodiment as depicted in FIG. 2 the text cursor 15 is used for graphically indicating the remaining space or even capacity for still entering data, such as characters, which can be subsequently processed all at once.

The logical connection or functional dependency between the changeable look of the text cursor 15 and the available amount of capacity is performed in practice by use of a processor unit integrated within the mobile phone. For example, the text cursor 15 is subdivided at least into two areas, such as a black and a white area, wherein the percentage each of the two areas is changed in functional dependency to the used capacity or to the still remaining capacity. Thus, for each inputted character a specific amount of the text cursor 15 is field up with black, in case the text cursor 15 is white when the entire capacity is available, or is field up with white, in case the text cursor 15 is black when the entire capacity is available.

Accordingly, in FIG. 2, the text cursor 15 is indicating, that approximately the half of the available edit field 11 is used, as explained in more detail below.

FIGS. 1a) and b) are representing two schematic sequences of possible indications that are proportional to the amount of remaining capacity or space for entering data, especially for entering characters, until the edit field 11 or the capacity for a further common processing step is filled up.

Regarding next FIG. 1a), the assumption that the cursor 15 is represented as an all-black box. Within the inventive approach, such common text cursor black box, as referenced by reference sign 1a, is indicating, that all characters are still available, i.e. 100% of the maximal capacity or space for entering data is still available.

Regarding the changed look of the cursor 15, as referenced by reference sign 2a, the black painted portion is reduced approximately to the half, whereas a white portion is extended to the half of the graphical cursor box element, in order to indicate that approximately half of the maximal useable field or capacity is already used and hence nearly the half of the capacity is still available.

Correspondingly the changed look of the cursor 15, as referenced by reference sign 3a of FIG. 1a), is indicating that about 30% of the initial capacity is still available. If the whole graphical element has completely changed its look, such as from black to white, as referenced by reference sign 4a of FIG. 1a), then no further characters are available, for writing a text.

Consequently, the percentage of the black portion of the graphic element, such as the text cursor 15 of FIG. 2, is proportional to the number or the amount of remaining characters, whereas the percentage of the white portion of the graphic element, as depicted in FIG. 1a) is proportional to the number or the amount of space or capacity already used.

It is stated however, that other shapes of cursors can be used as well. Moreover, even a separate graphic element which is changing its look in functional dependency to the available space and/or to the space already used, can be integrated into the display of the edit field 11. Thus, it is not necessary to use the cursor itself for graphically indicating the available entry space or capacity.

For example FIG. 1b) is depicting a similar sequence of a kind of pillar which is growing up proportional to the amount of used capacity.

Based on the afore mentioned 160 characters to which a SMS-message according to the GSM-standard is restricted, this can be accomplished for instance by subdividing the entire pillar in 160 portions by means of 40 rows with respectively 4 columns. Thus, each portion is representing a capacity amount of 0,625 percent and for each character entered, one of these portions is filed up in an application specific color or user based selected color.

Accordingly, if three of the 160 portions of the graphic pillar-like element are already filed up, as schematically indicated by reference sign 1b of FIG. 1b), approximately 1,875 percent of the entire available capacity is already used. Consequently, the look of the graphical element, schematically referenced by reference sign 2b is nearly filed up to the half and hence, approximately the half of the capacity is used and the half of the capacity is still available. By further entering data or characters, the look of the graphic element is changed via the condition, as referenced by reference sign 3b, indicating that approximately ¾ of the capacity is used to the look referenced by reference sign 4b indicating that the entire space ore capacity is used.

Since however, for the graphical indication substantially any kind of graphical element can be used, the inventive scope is not restricted to the use of the text cursor for the graphic element. To put the inventive approach into practice, it is proposed to provide with or for the electronic device a plurality of elements or symbols among which the user of the electronic device may choose a preferred one for the visual graphical indication. Furthermore, the inventive approach is preferably supported or entirely provided by the implementation of a correspondingly designed software.

Moreover, in particular with regard to the specific equipment of the respective electronic device, the graphic indication can be realized and/or supported by changing the color, such as for example by going through a specific color range in dependency of the available capacity. As an alternative or in addition the graphic indication can be supported by flashing the element, preferably by indicating the used spaced or capacity by changing the flashing frequency. As a further possibility, the graphic indication can be additionally supported by acoustic signals.

What is claimed:

1. A computer implemented method of indicating a remaining capacity for concurrently processing a predefined maximal number of data entered in an edit field of an electronic device, comprising:
   determining the remaining capacity; and
   providing a graphic element to visually represent the remaining capacity without employing a character.

2. A method of claim 1 further comprising changing the graphic element in functional dependency to the remaining capacity.

3. A method of claim 2, wherein the graphic element is subdivided into two areas, wherein the percentages of the two areas are changed in functional dependency to the remaining capacity.

4. A method of claim 2, wherein the graphic element is subdivided into several sub-portions, each of which represents a predefined amount of the predefined maximal number.

5. A method of claim 4 wherein each of the sub-portions is changed in functional dependency to the predefined amount.

6. A method of claim 2, wherein the graphic element is employed as a text cursor for the electronic device.

7. A method of claim 1 wherein the data are textual characters.

8. A method of claim 1 wherein the graphic element visually represents the remaining capacity via a change in color or a flashing frequency.

9. An electronic device having an edit field, comprising:
   means for entering data into the edit field;
   means for concurrently processing a predefined maximal number of data entered in the edit field; and
   a graphic element associated with the edit field for visually representing a remaining capacity of the predefined maximal number without employing a character.

10. An electronic device of claim 9, wherein the graphic element is changed in functional dependency to the remaining capacity.

11. An electronic device of claim 9, wherein the graphic element is subdivided into two areas, wherein the percentages of the two areas are changeable in functional dependency to the remaining capacity.

12. An electronic device of claim 9, wherein the graphic element is subdivided into several sub-portions, each representing a predefined amount of the predetermined maximal number.

13. An electronic device of claim 9 wherein each of the sub-portions is changed in functional dependency to the predefined amount.

14. An electronic device of claim 9, wherein the graphical element is employed as a text cursor for the electronic device.

15. An electronic device of claim 9 wherein the electronic device is a mobile phone.

16. An electronic device of claim 15 wherein the mobile phone is based on a GSM standard or a UMTS standard.

17. An electronic device of claim 9 wherein the data are textual characters.

18. An electronic device of claim 17 wherein the character is a number indicating a remaining number of textual characters that can be entered in the edit field.

19. An electronic device of claim 9 wherein the graphic element visually represents the remaining capacity via a change in color.

20. An electronic device of claim 9 wherein the graphic element visually represents the remaining capacity via flashing frequency.

* * * * *